United States Patent
Chiku

(10) Patent No.: US 8,400,515 B2
(45) Date of Patent: Mar. 19, 2013

(54) IMAGE CORRECTION PROCESSING APPARATUS AND METHOD

(75) Inventor: Mamoru Chiku, Kanagawa-ken (JP)

(73) Assignee: JVC Kenwood Corporation, Yokohama-shi (JP)

(*) Notice: Subject to any disclaimer, the term of this patent is extended or adjusted under 35 U.S.C. 154(b) by 366 days.

(21) Appl. No.: 12/699,051

(22) Filed: Feb. 3, 2010

(65) Prior Publication Data
US 2010/0194898 A1 Aug. 5, 2010

(30) Foreign Application Priority Data

Feb. 3, 2009 (JP) ................................ 2009-023023

(51) Int. Cl.
*H04N 5/228* (2006.01)
(52) U.S. Cl. .................................................. 348/208.4
(58) Field of Classification Search .. 348/208.4–208.15, 348/240.1–240.3
See application file for complete search history.

(56) References Cited

U.S. PATENT DOCUMENTS

| | | | | |
|---|---|---|---|---|
| 5,930,378 | A * | 7/1999 | Kubota et al. | 382/107 |
| 2003/0215051 | A1 * | 11/2003 | Suzuki | 378/19 |
| 2009/0051777 | A1 * | 2/2009 | Lee et al. | 348/208.99 |
| 2009/0074071 | A1 * | 3/2009 | Nagumo et al. | 375/240.16 |
| 2009/0096879 | A1 * | 4/2009 | Motomura et al. | 348/208.6 |

FOREIGN PATENT DOCUMENTS

| | | |
|---|---|---|
| JP | 04-011482 | 1/1992 |
| JP | H7-264464 | 10/1995 |
| JP | 2005-244780 | 9/2005 |
| JP | 2007-221631 | 8/2007 |
| JP | 2008-160274 | 7/2008 |

* cited by examiner

*Primary Examiner* — Chieh M Fan
*Assistant Examiner* — Akshay Trehan
(74) *Attorney, Agent, or Firm* — Venable LLP; Michael A. Sartori; Ryan M. Flandro

(57) ABSTRACT

A motion vector detecting unit detects a motion vector of each block in a shot image, which is divided into a plurality of blocks, during an optical zooming operation. A linear function calculating unit calculates for each block a linear function that represents a straight line, the slope of which is the same as that of a line passing through the center of the shot image and a representative point and which passes through a vector detection point. A hand-movement motion vector calculating unit selects at least two blocks that have the calculated linear functions, the slope of which are different from each other, and obtains an intersection of graphs of the linear functions of the selected blocks so as to calculate a motion vector caused by hand movement. A hand-movement correcting unit corrects the hand movement in the shot image based on the calculated motion vector caused by the hand movement.

5 Claims, 12 Drawing Sheets

| 1:25 | 2:24 | 3:23 | 4:22 | 5:21 |
|---|---|---|---|---|
| 6:20 | 7:19 | 8:18 | 9:17 | 10:16 |
| 11:15 | 12:14 | 13 | 12:14 | 11:15 |
| 10:16 | 9:17 | 8:18 | 7:19 | 6:20 |
| 5:21 | 4:22 | 3:23 | 2:24 | 1:25 |

IMAGE CORRECTION PROCESSING APPARATUS AND METHOD

CROSS-REFERENCE TO RELATED APPLICATION

The present application claims the priority benefit of Japanese patent application number 2009-023023 filed Feb. 3, 2009, the disclosure of which is incorporated herein by reference.

BACKGROUND OF THE INVENTION

1. Field of the Invention

The present invention relates to an image correction processing apparatus and method for performing hand-movement correction at the time of shooting an image.

2. Description of the Related Art

Shooting apparatus such as video cameras, digital still cameras, and the like have undergone a reduction in size and weight for ease of portability. It has consequently become difficult to avoid hand movement or camera shake at the time of shooting a picture. In addition, since the recent models are equipped with zoom lenses of high power, hand movement can be easily noticeable when performing telescopic shooting. Furthermore, due to the high quality of the shot image, when the image is output on a display or a printer with high resolution, the blur and distortion of the image caused by the motion often become evident.

One of methods for correcting hand movement is a real-time feedback control method where angular velocity caused by hand movement is detected by using a gyro sensor for detecting hand movement and is immediately fed back into the shooting system of a camera so as to avoid image blurring due to hand movement. Another method includes steps for detecting a motion vector caused by hand movement in a shot image and performing image processing for eliminating the effects caused by hand movement.

Japanese patent application publication number 2007-221631 discloses a method for correcting image distortion caused by hand movement. According to the method, when it is determined that an optical zooming operation is performed, the difference between a motion vector detected in the motion vector detecting step and a optical zoom vector calculated in the optical zoom component calculating step is computed. The hand-movement vector of the shot image is then computed from the resultant motion vector obtained from the difference calculation.

Japanese patent application publication number 2008-160274 discloses the following method. In comparing a reference image and an image for comparison and calculating the motion vector required for hand-movement correction, if the optical zoom factor has been changed, the method performs a correction on the magnification ratio of the reference image and the image for comparison so that the two images are of the identical optical zoom factor.

Japanese patent application publication number H7-264464 discloses an apparatus for detecting blurring of an image by detecting a motion vector for every divided area of the screen. If an optical zooming operation is detected, the apparatus switches control from using the motion vector detected for every divided area to using only the motion vector detected for the divided area at the central position of the screen.

According to the method disclosed in Japanese patent application publication number 2007-221631, the components of the changes in the image are calculated based on the position and/or velocity of the optical zooming. For the velocity of the optical zooming, about ten levels of the velocity would need to be considered for the calculation. A problem of the method is that it requires a large-sized table containing the position and velocity of the optical zooming and also requires a large amount of computation of the optical zooming components in the motion vector detecting step.

According to the method disclosed in Japanese patent application publication number 2008-160274, the camera needs to be provided with a reverse-zooming circuit for performing correction on the magnification ratio of the reference image and the image for comparison in order to adjust the zoom factor of the two images to be identical, resulting in additional cost.

The method disclosed in Japanese patent application publication number H7-264464 practically lacks in reliability for the following reason. Although there is no effect caused by the optical zooming at the central position of the screen, if the luminance level of the divided area at the central position of the screen is uniform, the detection of the motion vector becomes impossible.

Due to the above-mentioned problems, according to conventional hand-movement correction based on the motion vector detection, it is common that the correction process is temporarily terminated during the optical zooming operation, and simply the shot image is extracted from the center and output without performing any hand-movement correction.

SUMMARY OF THE INVENTION

In this background, a general purpose of the present invention is to provide an image correction processing apparatus and method by which to effectively perform hand-movement correction even during an optical zooming operation.

One embodiment of the present invention relates to an image correction processing apparatus. The apparatus comprises: a motion vector detecting unit configured to detect a motion vector of each block in a shot image during an optical zooming operation, the image being divided into a plurality of blocks; a linear function calculating unit configured to calculate for each block a linear function that represents a straight line, the slope of which is the same as that of a line passing through the center of the shot image and a representative point and which passes through a vector detection point; a hand-movement calculating unit configured to select at least two blocks that have the calculated linear functions, the slope of which are different from each other, and configured to obtain an intersection of graphs of the linear functions of the selected blocks so as to calculate a motion vector caused by hand movement; and a hand-movement correcting unit configured to correct the hand movement in the shot image based on the calculated motion vector caused by the hand movement.

Another embodiment of the present invention also relates to an image correction processing apparatus. The apparatus comprises: a motion vector detecting unit configured to detect a motion vector of each block in a shot image during an optical zooming operation, the image being divided into a plurality of blocks; a hand-movement calculating unit configured to select two blocks at a symmetric position with respect to a center of the shot image and configured to average two motion vectors detected in the selected two blocks so as to eliminate a motion component caused by optical zooming and to calculate a motion vector caused by hand movement; and a hand-movement correcting unit configured to correct the hand movement in the shot image based on the calculated motion vector caused by the hand movement.

Yet another embodiment of the present invention also relates to an image correction processing apparatus. The apparatus comprises: a motion vector detecting unit configured to detect motion vectors at a central column of blocks and motion vectors at a central row of blocks of a shot image, the shot image being divided into blocks in such a manner that the number of the blocks in a column and in a row are odd; a hand-movement calculating unit configured to average horizontal components of the motion vectors detected in the central column of blocks and also configured to average vertical components of the motion vectors detected in the central row of blocks so as to obtain a motion vector caused by hand movement with the averaged horizontal and vertical components; and a hand-movement correcting unit configured to correct the hand movement in the shot image based on the obtained motion vector caused by the hand movement.

Yet another embodiment of the present invention relates to an image correction processing method. The method comprises: detecting a motion vector of each block in a shot image during an optical zooming operation, the image being divided into a plurality of blocks; calculating for each block a linear function that represents a straight line, the slope of which is the same as that of a line passing through the center of the shot image and a representative point and which passes through a vector detection point; selecting at least two blocks that have the calculated linear functions, the slope of which are different from each other, and obtaining an intersection of graphs of the linear functions of the selected blocks so as to calculate a motion vector caused by hand movement; and correcting the hand movement in the shot image based on the calculated motion vector caused by the hand movement.

Optional combinations of the aforementioned constituting elements, and implementations of the invention in the form of methods, processors, apparatuses, systems, computer programs, data structures, recording media, etc. may also be practiced as additional may also be practiced as additional modes of the present invention.

BRIEF DESCRIPTION OF THE DRAWINGS

Embodiments will now be described by way of examples only, with reference to the accompanying drawings, which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

First, the hand-movement correction processing methods according to a several embodiments of the present invention are explained with reference to FIG. 1 through FIG. 20. Next, the structure of a shooting apparatus that is equipped with hand-movement correction functions is explained with reference to FIG. 21 and FIG. 22.

Figure 1:
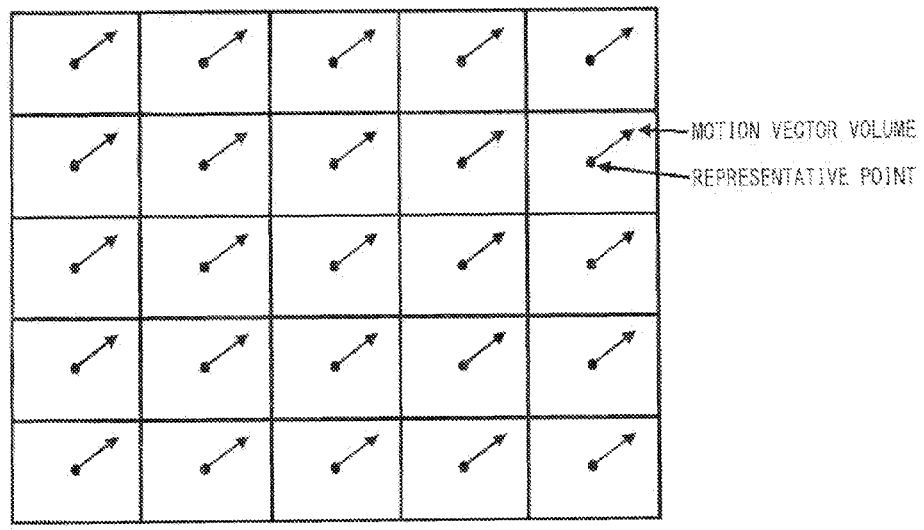
FIG. 1 illustrates a representative point and a motion vector of each block in a shot image that is divided into 25 blocks.

A general hand-movement correction process is first explained with reference to FIG. 1 through FIG. 3. FIG. 1 illustrates a motion vector of each block in a shot image that is divided into 25 blocks. A representative point is a pixel at the center of each block. A motion vector by hand movement (hereinafter simply referred to as "hand-movement vector") is obtained by detecting where a pixel having the luminance value of the pixel of the representative point is moved by the hand movement. The direction and size of the hand-movement vector can be detected by searching for a pixel within the block with respect to an x-axis and a y-axis, which has a luminance value closest to the luminance value of the pixel of the representative point.

Figure 2:
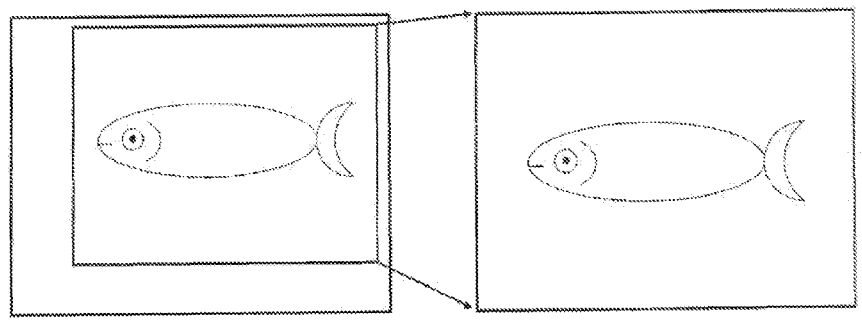
FIG. 2 illustrates a process for extracting from a frame memory an output image that was subjected to hand-movement correction.

FIG. 2 illustrates a process for extracting from a frame memory an output image that was subjected to hand-movement correction. The hand-movement vectors obtained in the 25 blocks of FIG. 1 are averaged, and the central position for extracting the output image from the frame memory is shifted based on the averaged hand-movement vector. The left-hand side of FIG. 2 shows the shot image stored in the frame memory.

If there is no hand movement, an output image, the center of which is identical to that of the shot image, can be extracted. However, if any hand-movement vectors are detected as shown in FIG. 1, the central position from which the output image is extracted should be shifted according to the direction and amount of the motion indicated by the averaged hand-movement vector so that the output image shown in the right-hand side of FIG. 2 can be extracted. The hand-movement corrected image is thus output.

Figure 3:
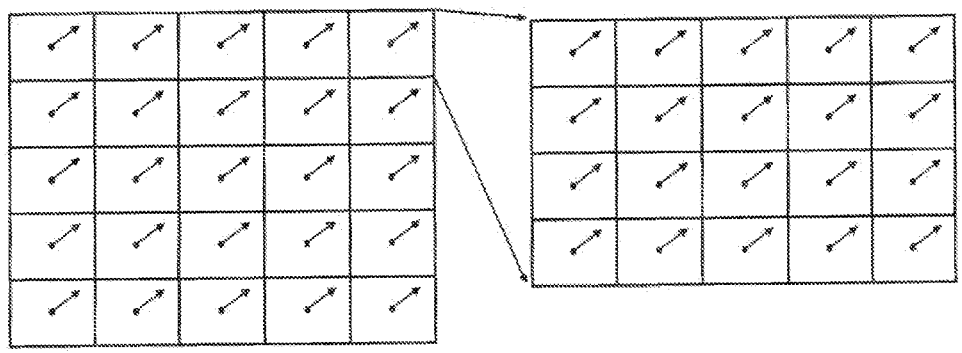
FIG. 3 illustrates how a motion vector is detected in each block in the shot image.

FIG. 3 illustrates how a motion vector is detected in each block in the shot image. In FIG. 1, the shot image is divided into 25 blocks, and a motion vector is detected in each block; however, in an implementation, each block is divided into, for instance, 20 areas as shown in the right-side of FIG. 3. The central pixel of each area is a representative point, and a motion vector is detected for each area. The motion vector of the block is given by averaging the motion vectors of 20 areas. For ease of explanation, an explanation is given on the assumption that each block has only one representative point.

Figure 4:
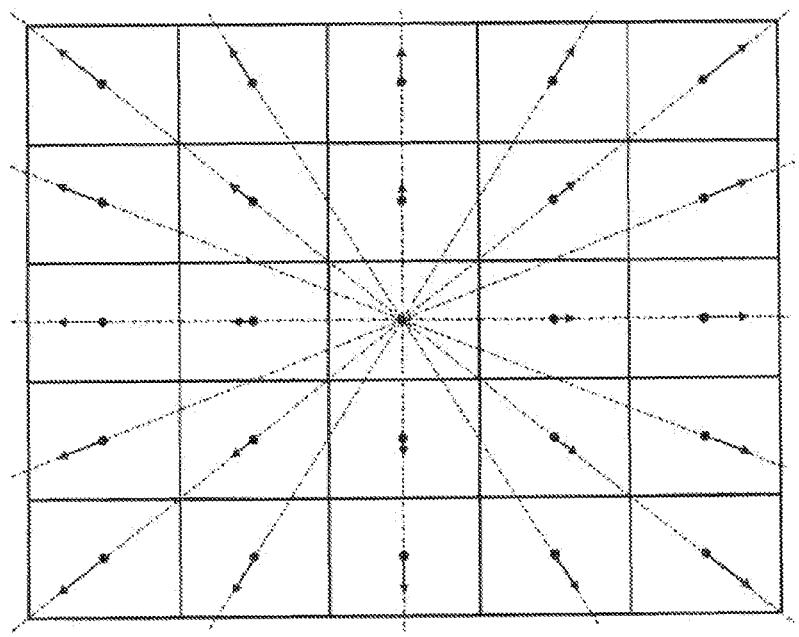
FIG. 4 illustrates how a motion vector is detected in each block in the shot image during an optical zooming operation.
Figure 5:
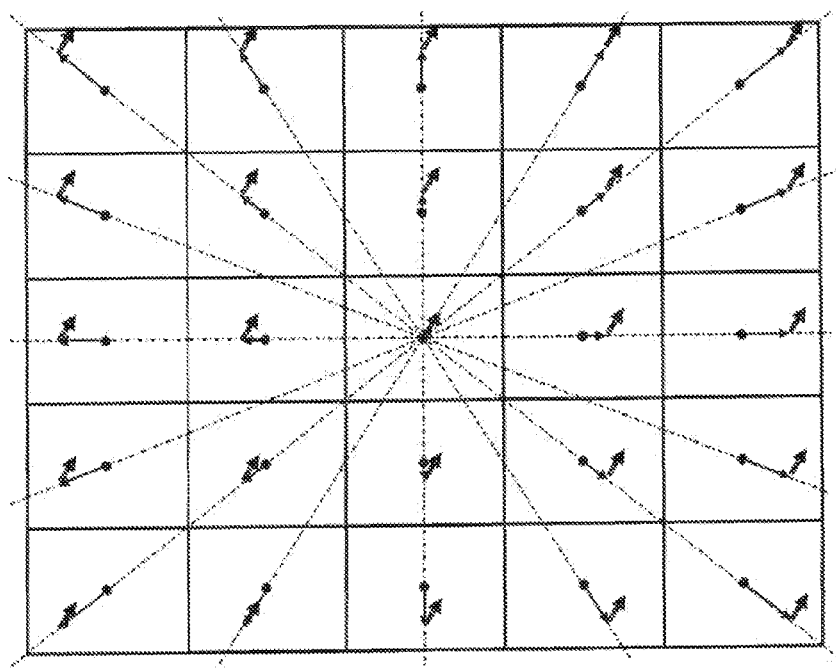
FIG. 5 illustrates how the motion vectors are detected when hand movement occurs during the optical zooming operation.
Figure 6:
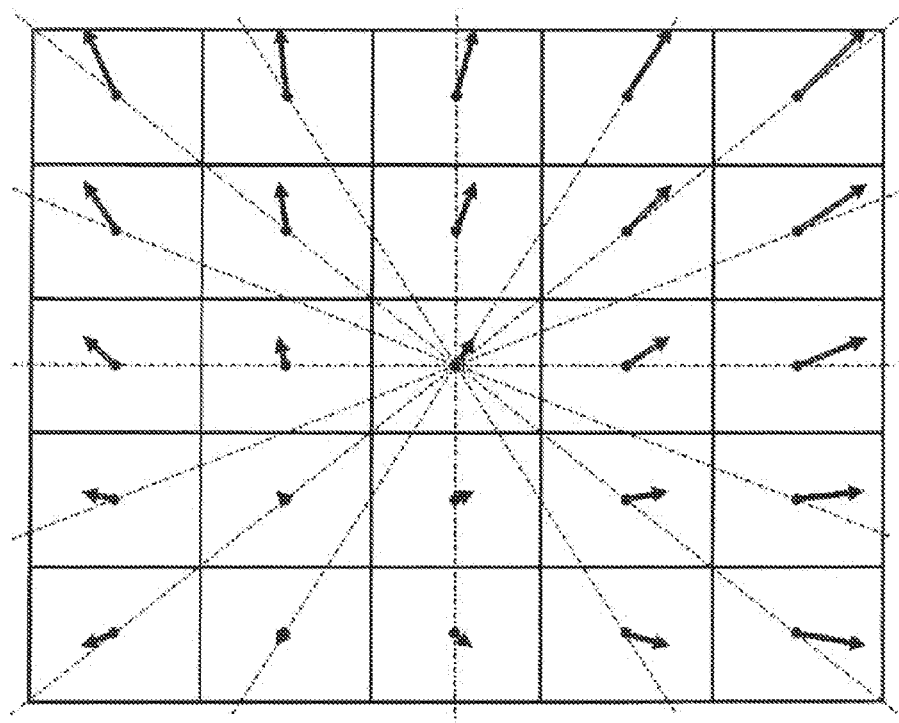
FIG. 6 illustrates the composition of a motion vector caused by hand movement and a motion vector caused by the optical zooming in each block of the shot image.

With reference to FIG. 4 to FIG. 6, a problem in the hand-movement correction during an optical zooming operation is explained. FIG. 4 illustrates how a motion vector is detected in each block in the shot image during the optical zooming operation. With no hand movement, the motion vector of each block will be detected in a radial pattern expanding from the center of the shot image, if the optical zoom is operated in a telescope direction. The size of the motion vector changes depending on the speed of the optical zooming operation.

FIG. 5 illustrates how the motion vectors are detected when hand movement occurs during the optical zooming operation. An arrow indicates a motion vector caused by the optical zooming (hereinafter simply referred to as a "zoom vector"), and a double arrow indicates a hand-movement vector. The hand-movement vectors are added to the zoom vectors expanding from the center of the shot image in a radial pattern, and the resultant vectors are detected.

FIG. 6 illustrates the composition of a motion vector caused by hand movement and a motion vector caused by the optical zooming in each block of the shot image. The motion vector of each block is detected as a composed vector as shown in the figure. As it is understood that the hand-movement vector cannot be separately detected, it is difficult to perform a hand-movement correction processing during the optical zooming operation. Even though the composed vectors of all the blocks are averaged, a correct hand-movement vector cannot be obtained since the accuracy of the motion vector varies widely from block to block.

With reference to FIG. 7 through FIG. 16, a hand-movement correction processing method is shown according to an embodiment of the present invention.

Figure 7:
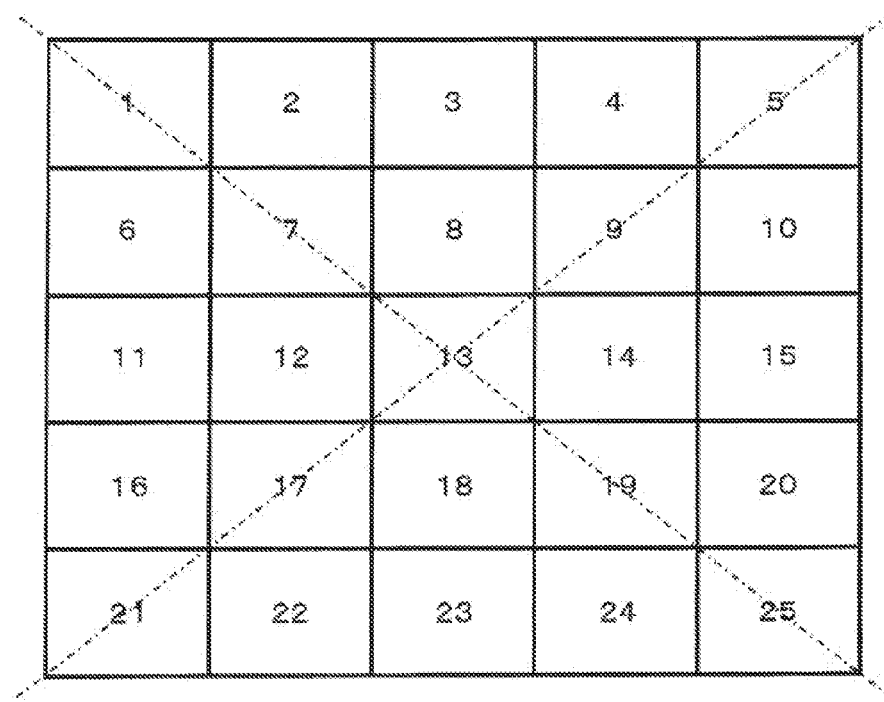
FIG. 7 shows the block number of the shot image.

FIG. 7 shows the block number of the shot image. Starting from the top left corner (that is the first block), the block number is assigned from left to right and from top to bottom, block by block. The center of the shot image is the thirteenth block. The fifth, ninth, thirteenth, seventeenth, and twenty-first blocks are on the upper-right diagonal line passing through the center of the shot image. The first, seventh, thirteenth, nineteenth, twenty-fifth blocks are on the lower-left diagonal line.

Figure 8:
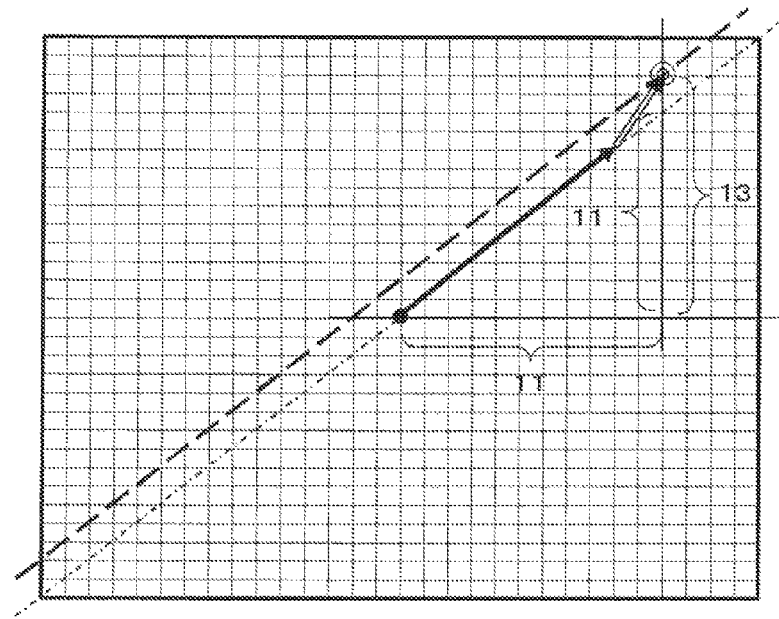
FIG. 8 shows a representative point, a zoom vector and a hand-movement vector in the fifth block shown in FIG. 7.

FIG. 8 shows a representative point, a zoom vector, and a hand-movement vector in the fifth block shown in FIG. 7. The representative point is the central point of the fifth block. The zoom vector is indicated by the solid arrow, and the hand-movement vector is indicated by the double-line arrow. A vector in which the zoom vector and the hand-movement vector are synthesized will be detected at the position indicated by the double circle. The point indicated by the double circle is hereinafter referred to as a "vector detection point."

Since the size of the vector indicated by the solid arrow depends on the speed of zooming, it is difficult to identify the zoom vector. Since the zoom vector cannot be identified, it is not possible to directly detect the hand-movement vector indicated by the double-line arrow, and the hand-movement vector remains unsolved.

The dashed-dotted line indicates a straight line $y=x$ that passes through the center of the shot image and the representative point of the fifth block. The zoom vector resides on the dashed-dotted line. The line indicated by the dashed-dotted line is called a "zoom baseline."

The dashed line indicates a straight line, the slope of which is the same as that of the line (zoom baseline) indicated by the dashed-dotted line and which passes through the vector detection point. The line indicated by the dashed line is called a "hand-movement baseline." The slope a of the hand-movement baseline $y=ax+b$ is the same as that of the zoom baseline $y=x$, and therefore $a=1$. The intercept b of the hand-movement baseline can be obtained by the difference between the y-coordinate value "13" of the vector detection point and the y-coordinate value "11" obtained by substituting the x-coordinate value "11" of the vector detection point into the zoom baseline expression $y=x$, and therefore $b=13-11=2$. The hand-movement component can be determined as a point on the hand-movement baseline $y=x+2$ thus obtained.

Figure 9:
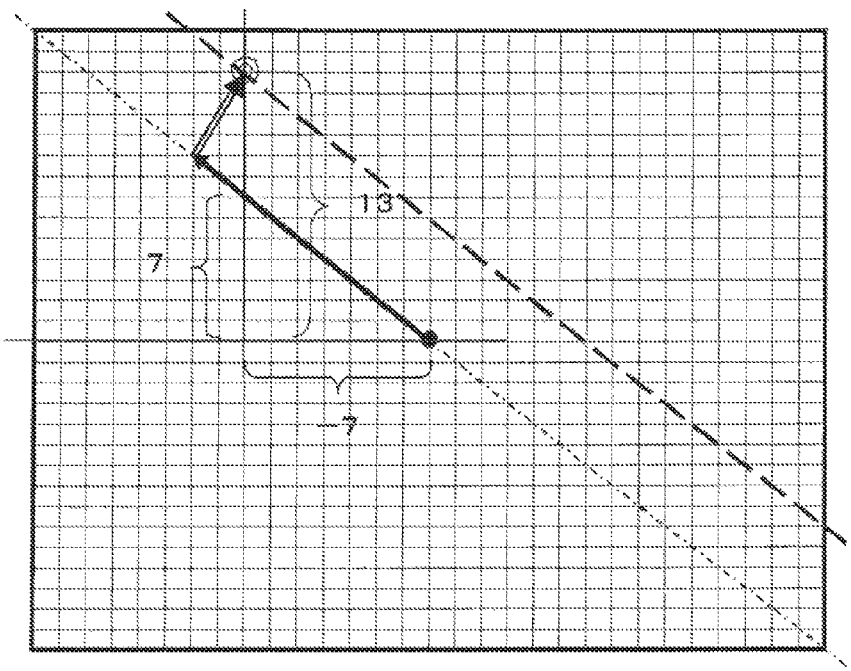
FIG. 9 shows a representative point, a zoom vector and a hand-movement vector in the first block shown in FIG. 7.

FIG. 9 shows a representative point, a zoom vector and a hand-movement vector in the first block shown in FIG. 7. The representative point is the central point of the first block. As in FIG. 8, the zoom vector and the hand-movement vector are indicated by the solid arrow and the double-line arrow, respectively. The vector detection point will be detected at the position indicated by the double circle where the zoom vector and the hand-movement vector are synthesized.

As in FIG. 8, the dashed-dotted line indicates a line (zoom baseline) $y=-x$ that passes through the center of the shot image and the representative point of the first block. The dashed line is a line (hand-movement baseline), the slope of which is the same as that of the zoom baseline $y=-x$ and which passes through the vector detection point. The slope a of the hand-movement baseline $y=ax+b$ is the same as that of the zoom baseline $y=-x$, and therefore $a=-1$. The intercept b of the hand-movement baseline can be obtained by the difference between the y-coordinate value "13" of the vector detection point and the y-coordinate value "7" obtained by substituting the x-coordinate value "−7" of the vector detection point into the zoom baseline expression $y=-x$, and therefore $b=13-7=6$. The hand-movement component can be determined as a point on the hand-movement baseline $y=-x+6$ thus obtained.

Figure 10:
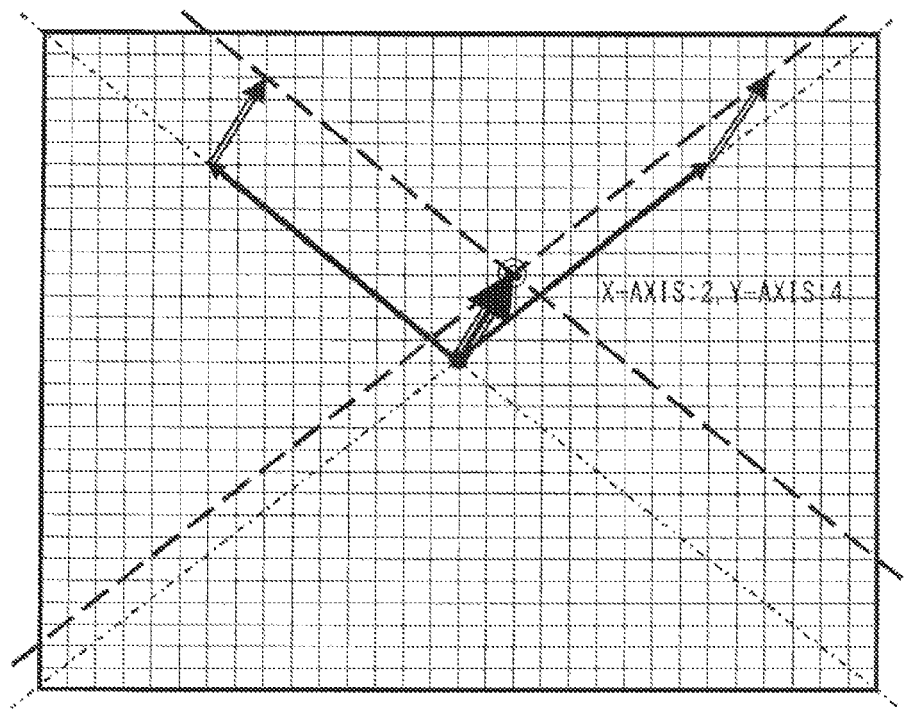
FIG. 10 shows a diagram in which the zoom vectors and the hand-movement vectors of the fifth block of FIG. 8 and those of the first block of FIG. 9 are synthesized.

FIG. 10 shows a diagram in which the zoom vectors and the hand-movement vectors of the fifth block of FIG. 8 and those of the first block of FIG. 9 are synthesized. The hand-movement component can be obtained as the intersection of the hand-movement baseline $y=x+2$ of the fifth block shown in FIG. 8 and the hand-movement baseline $y=-x+6$ of the first block shown in FIG. 9. In FIG. 10, the intersection is indicated by the double circle. By solving a set of the simultaneous equations: $y=x+2$ and $y=-x+6$, the x-coordinate value "2" and the y-coordinate value "4" of the intersection are obtained. The hand-movement vector to be requested is indicated by the triple line arrow, the initial point of which is the representative point at the center of the block and the terminal point of which is the intersection thus obtained. The hand-movement vector is a vector that is obtained by subtracting the zoom vector from the motion vector and that represents a motion caused by the hand movement only.

By selecting any two blocks having the hand-movement baseline of different slopes and obtaining the intersection of the hand-movement baselines of the two blocks, the hand-movement vector can be obtained. For instance, the slope of the hand-movement baseline of the fifth block is "1", and the slope of the hand-movement baseline of the sixteenth block is "0.5." The slopes of the hand-movement baselines of these two blocks are different. By using the combination of these two blocks and obtaining the intersection of their hand-movement baselines, the hand-movement vector can also be obtained.

Figure 11:
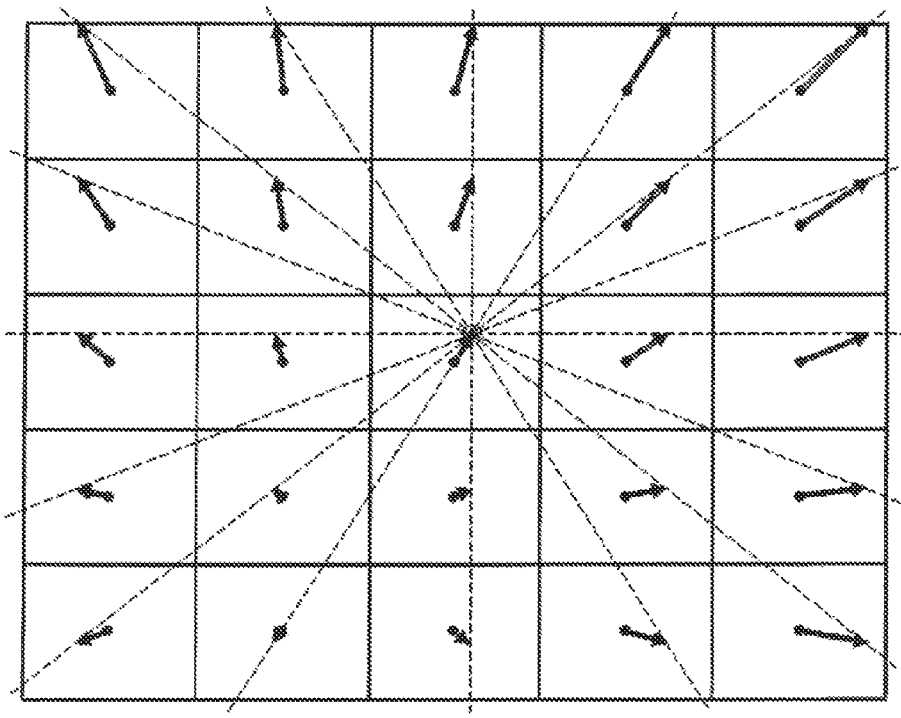
FIG. 11 is a diagram illustrating how the radial lines extending from the center of the shot image of FIG. 6 are shifted by using the hand-movement vector obtained in FIG. 10.

FIG. 11 is a diagram illustrating how the radial lines extending from the center of the shot image of FIG. 6 are shifted by using the hand-movement vector obtained in FIG. 10. The hand movement causes the center of the radial lines to shift to a position indicated by the double circle. The degree of the accuracy of the obtained hand-movement vector can be confirmed by checking whether or not the terminal point of each of the motion vectors is located on the shifted radial lines of FIG. 11.

The hand-movement vector can be obtained by selecting any two blocks having the hand-movement baselines of different slopes and obtaining the intersection of their hand-movement baselines; however, it is desirable to average the plurality of hand-movement vectors obtained by using the number of the combinations of such two blocks in order to increase the accuracy of the hand-movement vector.

Figure 12:
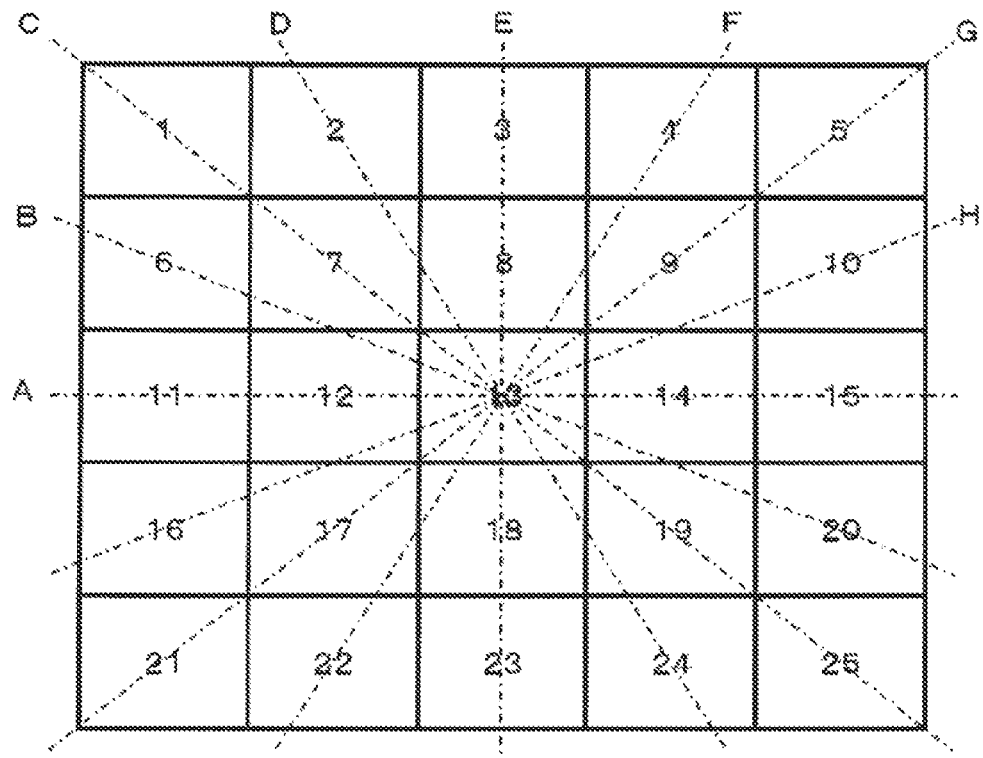
FIG. 12 is a diagram illustrating a zoom baseline of each block of the shot image.

FIG. 12 is a diagram illustrating the zoom baseline of each block of the shot image. The eight dashed-dotted lines indicated by alphabetic letters A through H are the zoom baselines of the respective blocks. For instance, the dashed-dotted line indicated by A is the zoom baseline of the eleventh to fifteenth blocks, and its slope is zero. The dashed-dotted line indicated by G is the zoom baseline of the fifth, ninth, thirteenth, seventeenth, and twenty-first blocks, and its slope is 1.

The two blocks having the hand-movement baselines of different slopes are selected to obtain the hand-movement vector. In the case of FIG. 12, the selection of such two blocks corresponds to the selection of the two zoom baselines of different slopes among the zoom baselines indicated by the eight dashed-dotted lines A through H. For instance, the fifth block having the zoom baseline indicated by the dashed-dotted line G can be combined with any one of blocks having the zoom baselines indicated by the dashed-dotted lines A through F and H. The combination of the two blocks having the baseline of the same dashed-dotted line is not applicable to the method for obtaining the hand-movement vector through the intersection of the two zoom baselines since the two zoom baselines have the same slope.

Figure 13:
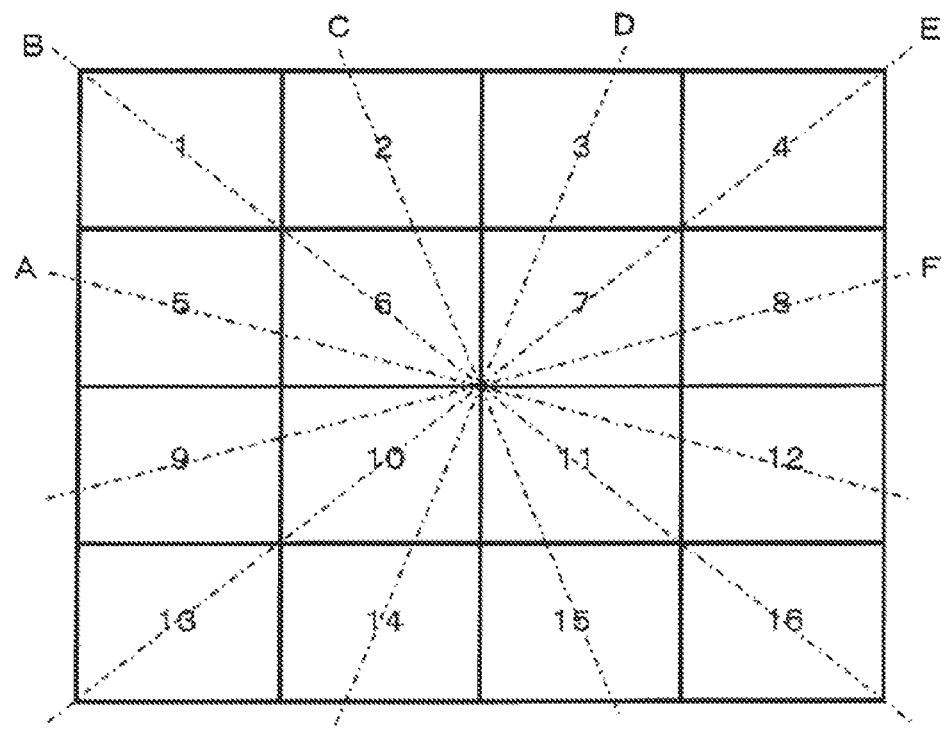
FIG. 13 is a diagram illustrating a zoom baseline of each block in the shot image having a different number of blocks.

FIG. 13 is a diagram illustrating the zoom baseline of each block in the shot image having a different number of blocks. The shot image is divided into sixteen blocks. By drawing straight lines that extend from the center of the shot image to the representative points of the respective blocks, the zoom baselines are obtained as indicated by the six dashed-dotted lines A through F. For instance, the second block having the zoom baseline indicated by the dashed-dotted line C can be combined with any one of blocks having the zoom baselines indicated by the dashed-dotted lines A, B, and D through F.

Figure 14:
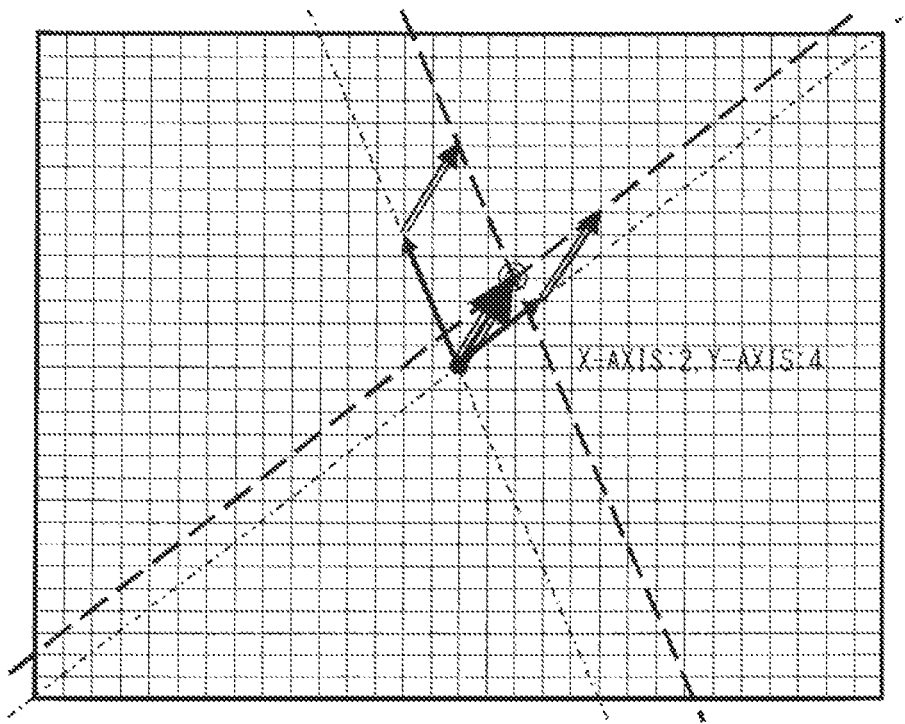
FIG. 14 illustrates a method for obtaining a hand-movement vector by using a pair of the second block and the seventh block of FIG. 13.

FIG. 14 illustrates a method for obtaining the hand-movement vector by using the pair of the second block and the seventh block of FIG. 13. By obtaining the intersection of the hand-movement baseline $y=-3x+10$ of the second block and the hand-movement baseline $y=x+2$ of the seventh block, the x-component "2" and the y-component "4" of the hand-movement vector are obtained. The triple-line arrow of FIG. 14 indicates the hand-movement vector thus obtained.

In FIG. 12 and FIG. 13, the blocks having zoom baselines of the same slope can be aggregated into one group. In each group, the degree of the accuracy of the hand-movement baseline can be increased by averaging the values of intercepts b of the hand-movement baselines obtained for the respective blocks that belong to the same group.

Figure 15:
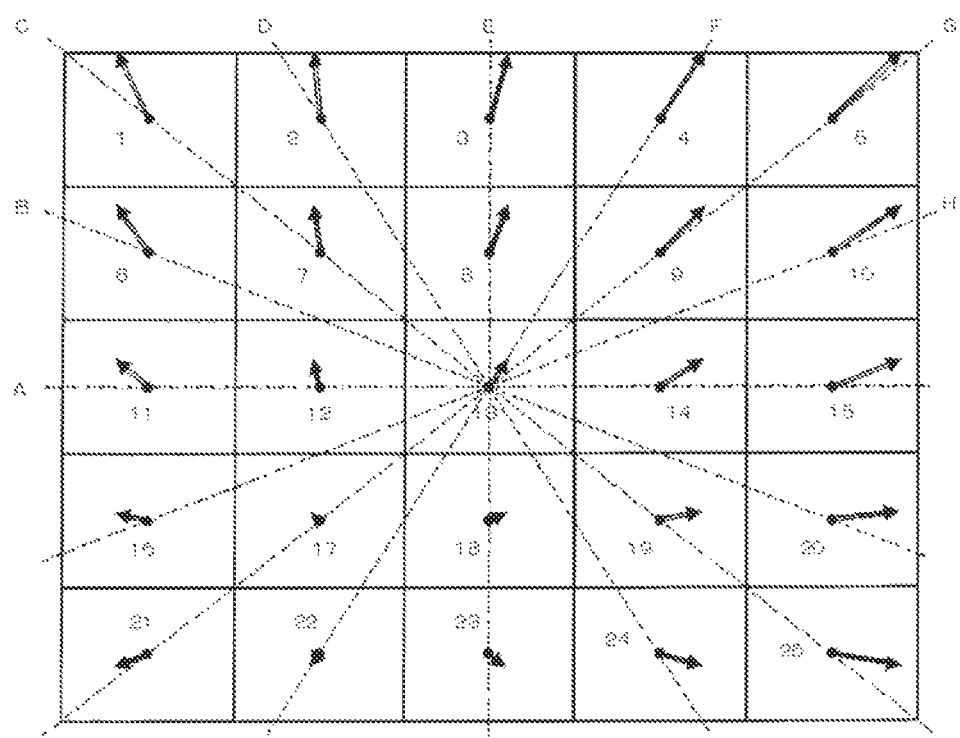
FIG. 15 illustrates a method for averaging the intercepts of the hand-movement baselines in a group of blocks having the zoom baselines of the same slope.

FIG. 15 illustrates a method for averaging the intercepts of the hand-movement baselines in a group of blocks having zoom baselines of the same slope. The intercept-averaged hand-movement baseline $y=b$ is obtained by averaging the intercepts b of the hand-movement baselines obtained in the eleventh to fifteenth blocks of the zoom baseline of the slope "0" indicated by the dashed-dotted line A.

Likewise, the intercept-averaged hand-movement baseline $y=-0.5x+b$ is obtained by averaging the intercepts b of the hand-movement baselines obtained in the sixth, thirteenth, and twentieth blocks of the zoom baseline of the slope "−0.5" indicated by the dashed-dotted line B.

The intercept-averaged hand-movement baseline $y=-x+b$ is obtained by averaging the intercepts b of the hand-movement baselines obtained in the first, seventh, thirteenth, nineteenth, and twenty-fifth blocks of the zoom baseline of the slope "−1" indicated by the dashed-dotted line C.

The intercept-averaged hand-movement baseline $y=-2x+b$ is obtained by averaging the intercepts b of the hand-movement baselines obtained in the second, thirteenth, and twenty-fourth blocks of the zoom baseline of the slope "−2" indicated by the dashed-dotted line D.

The intercept-averaged hand-movement baseline $x=b$ is obtained by averaging the intercepts b of the hand-movement baselines obtained in the third, eighth, thirteenth, eighteenth, and twenty-third blocks of the zoom baseline of the infinite slope indicated by the dashed-dotted line E.

The intercept-averaged hand-movement baseline $y=2x+b$ is obtained by averaging the intercepts b of the hand-movement baselines obtained in the fourth, thirteenth, and twenty-second blocks of the zoom baseline of the slope "2" indicated by the dashed-dotted line F.

The intercept-averaged hand-movement baseline $y=x+b$ is obtained by averaging the intercepts b of the hand-movement baselines obtained in the fifth, ninth, thirteenth, seventeenth, and twenty-first blocks of the zoom baseline of the slope "1" indicated by the dashed-dotted line G.

The intercept-averaged hand-movement baseline $y=0.5x+b$ is obtained by averaging the intercepts b of the hand-movement baselines obtained in the tenth, thirteenth, and sixteenth blocks of the zoom baseline of the slope "0.5" indicated by the dashed-dotted line H.

It is noted that when the intercepts of the hand-movement baselines of the respective blocks are averaged for a group of blocks having the zoom baseline indicated by each dashed-dotted line, if the degree of the accuracy of the motion vector of any one of blocks is lower than a predetermined threshold, the block in question may be excluded before the average of the intercepts of the hand-movement baselines is calculated.

The averaged hand-movement baseline $y=ax+b$ for each group corresponding to any one of the eight dashed-dotted lines A through G is thus obtained. By selecting any two groups among these eight groups A through G and obtaining the intersection of the averaged hand-movement baselines of the two groups, the hand-movement vector can be calculated.

Figures 16, 17:
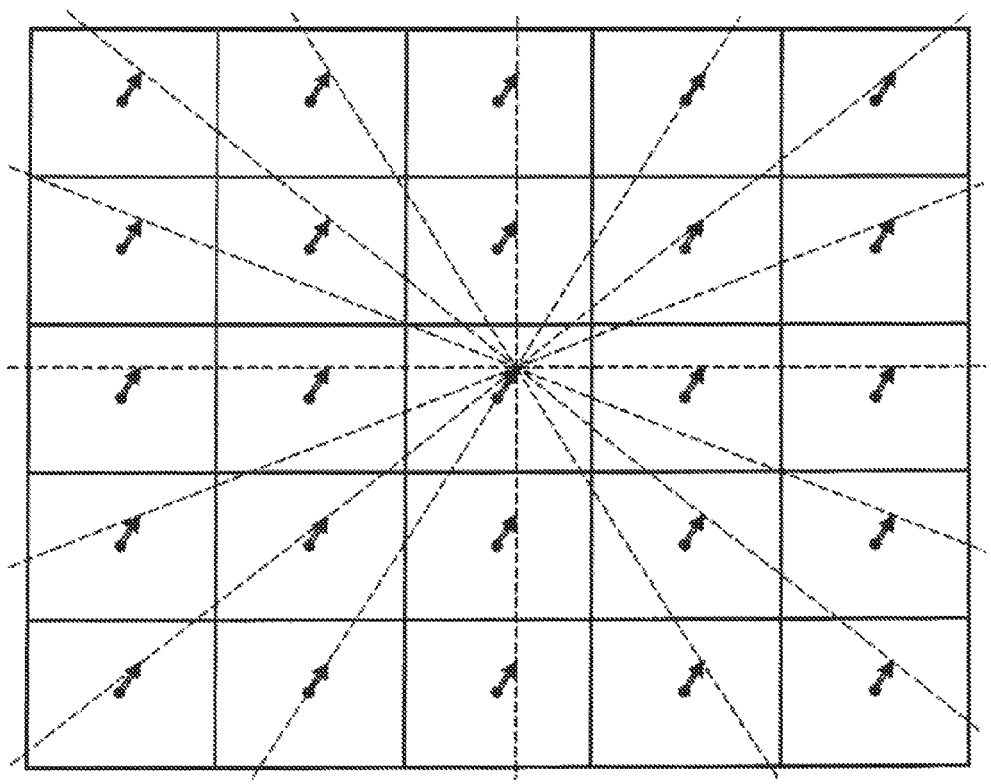
FIG. 16 illustrates combinations for selecting two groups from the groups, each of which is indicated by one of the eight dashed-dotted lines.
FIG. 17 illustrates a motion vector of each block in the shot image during the normal shooting with no optical zooming operation.

FIG. 16 illustrates combinations for selecting two groups from the groups, each of which is indicated by one of the eight dashed-dotted lines A through G. There are the combinations of $_8C_2=8!/(2!6!)=28$, in total. For each of the combinations of these groups, the intersection of the averaged hand-movement baselines is obtained, and the hand-movement vector is calculated. The final hand-movement vector is calculated by averaging the 28 hand-movement vectors. By doing this, the detection accuracy of the hand-movement vector can be increased.

The method for calculating the hand-movement vector by eliminating the zoom vector component from the motion vector detected during the optical zooming operating has been described with reference to FIG. 7 through FIG. 16. However, the method is not restricted to apply in the optical zooming operation. The method can be also applied without problem in a normal shooting where no optical zooming operation is performed.

FIG. 17 illustrates the motion vector of each block in the shot image during the normal shooting with no optical zooming operation. Since no optical zooming operation was performed, the motion vectors have no offset that would be otherwise caused by a zoom vector component. The method for calculating the hand-movement vector with reference to FIG. 7 through FIG. 16 can also be applied even to this case. As described before, the intercepts of the hand-movement baselines are averaged for each of the groups indicated by the eight dashed-dotted lines. The hand-movement vector can be calculated by selecting any two groups and obtaining the intersection of the averaged hand-movement baselines.

FIG. 17 illustrates the zoom baselines that extend in a radial pattern from a shifted central point of the shot image, in which the destination of movement of the central point has been determined based on the hand-movement vector thus obtained. As clearly understood in the figure, the hand-movement correction processing method according to the embodiment of the present invention can be also applied in the normal shooting where no optical zooming operation is performed.

The same hand-movement correction process can thereby handle the hand movement both in the optical zooming operation and in normal shooting without zooming, and therefore, it is not necessary to switch over from one process for the optical zooming operation to another process for normal shooting, resulting in a simplified configuration of hardware and/or software that realizes the hand-movement correction process.

Figures 18, 19:
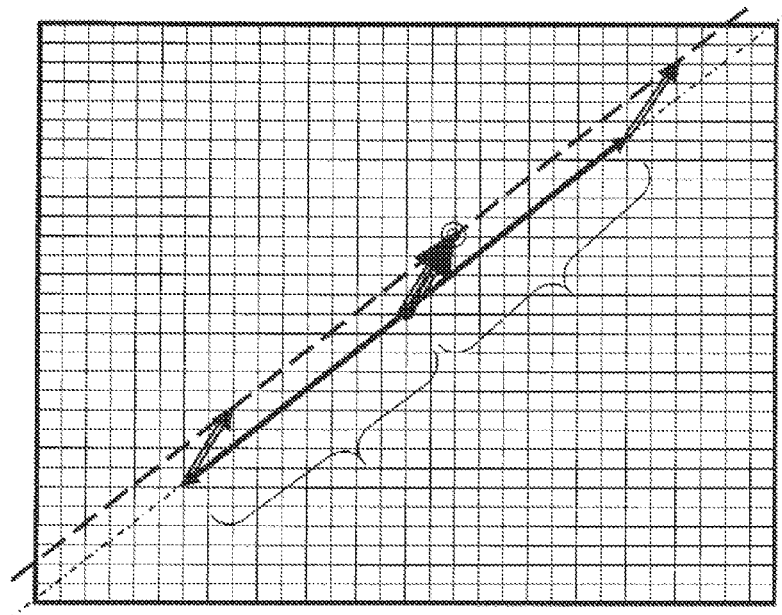
FIG. 18 and FIG. 19 illustrate a hand-movement correction processing method according to another embodiment of the present invention.

FIG. 18 and FIG. 19 illustrate a hand-movement correction processing method according to another embodiment of the present invention.

FIG. 18 shows the motion vectors in the two blocks that are at a symmetric position with respect to the center of the shot image. Referring to the arrangement of the blocks in the shot image of FIG. 7, the fifth and the seventeenth blocks are at the symmetric position with respect to the center. The zoom vector of the fifth block and the zoom vector of the seventeenth block have the same size but are on the opposite directions. Therefore, the average of the motion vectors detected in the fifth and the seventeenth blocks will cancel the zoom vector component, and only the hand-movement vector component will remain.

The motion component caused by the optical zooming can be eliminated by selecting the two blocks at the symmetric position with respect to the center of the shot image and averaging the motion vectors detected in the two selected blocks so that the hand-movement vector can be calculated.

FIG. 19 shows the combinations of the two blocks at a symmetric position with respect to the center of the shot image. If the shot image is divided into twenty-five blocks, there are twelve combinations of two blocks at a symmetric position as shown in FIG. 19. By averaging the motion vectors for each of these combinations of two blocks, the hand-movement vector is calculated for each combination. The final hand-movement vector is obtained by averaging the twelve hand-movement vectors.

It is noted that when a pair of blocks at the symmetric position with respect to the center of the shot image is selected, if the degree of the detection accuracy of the motion vector in at least one of the two blocks is lower than a predetermined threshold, it is desirable to exclude the pair of blocks from the selection for the following reason. If the reliability of the motion vector of one block of the block pair is not high, the optical zoom component cannot be cancelled even when averaging the two motion vectors of the block pair, and therefore, the hand-movement vector cannot be properly obtained for that block pair.

The detection accuracy of the motion vector can be decreased in the following cases. For instance, if the shot image contains the sky or a wall or if a lattice pattern appears in the image, there will be a limitation to detecting the motion vector by searching a pixel of the same level of luminance, and therefore, the reliability of the motion vector may be remarkably degraded for some blocks.

When a motion vector is searched based on the luminance value of the representative point, more specifically, when a corresponding pixel, the luminance level of which is closest to that of the pixel of the representative point, is searched, if the difference between the luminance levels of the pixel of the representative point and the corresponding pixel is larger than a threshold, it is determined that the accuracy of the motion vector detection point of the block is low. However, if the shot image contains an area such as the sky or a wall, there will be an almost uniform level of the luminance in such an area, and the difference in the luminance level will become small so that it is inaccurately determined that the reliability is high. For this reason, the following method for determining the reliability is used. The first and the second pixels are selected, the luminance levels of which are the closest and the second closest to that of the pixel of the representative point, respectively. If the difference between the luminance levels of the first and the second pixels is smaller than a predetermined threshold, it is determined that the reliability of the motion vector detection point of this block is low, and the block that this representative point belongs to is excluded from the selection. Furthermore, if one block shows a different motion from the other blocks due to the movement of the object to be shot, this block may be excluded from the selection.

Figure 20:
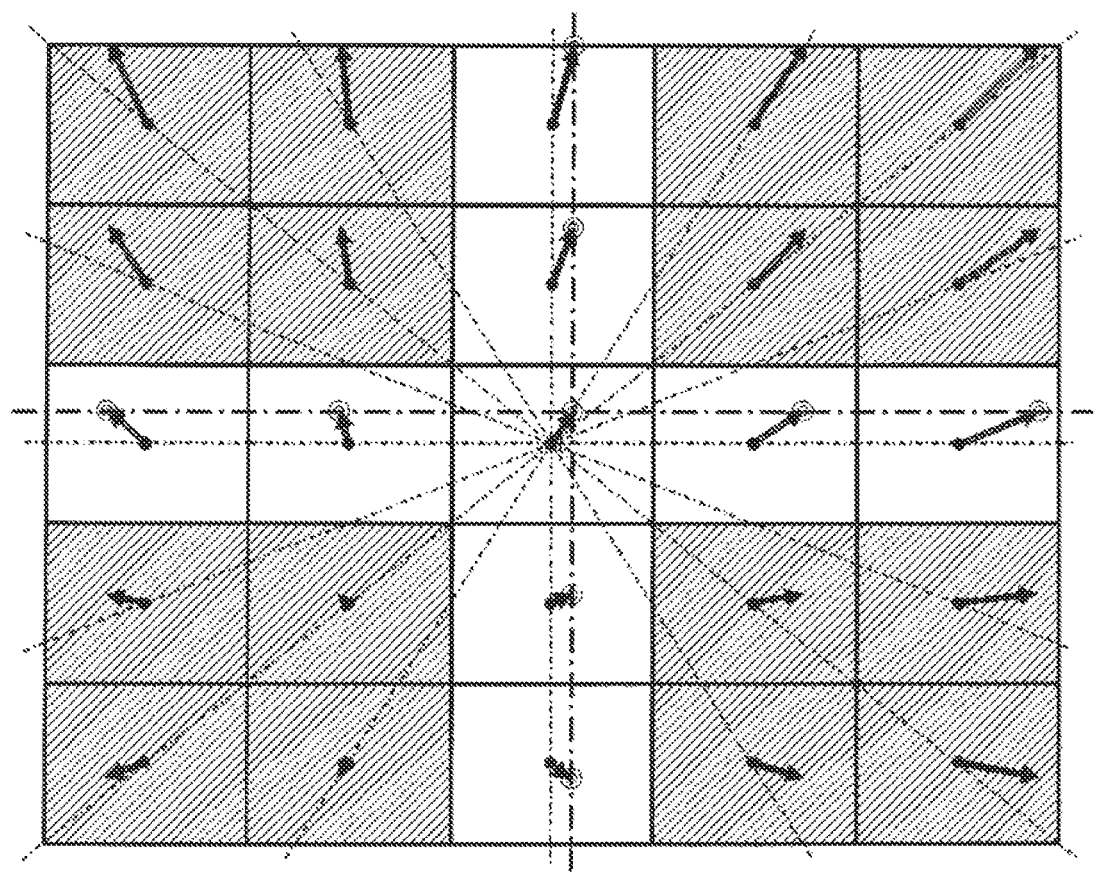
FIG. 20 illustrates a hand-movement correction processing method according to yet another embodiment of the present invention.

FIG. 20 illustrates a hand-movement correction processing method according to yet another embodiment of the present invention. The number of blocks in the vertical and horizontal directions is odd in the shot image of FIG. 20. In this case, the zoom component exists only in the y-axis direction at the central vertical column of the blocks including the center of the shot image, and therefore, only the hand-movement component appears in the x-axis direction. On the other hand, the zoom component exists only in the x-axis direction at the central horizontal row of the blocks including the center of the shot image, and therefore, only the hand-movement component appears in the y-axis direction.

The motion vectors during the optical zooming operation are detected at the central vertical column of the blocks including the center of the shot image, and the x-axis components of the detected motion vectors are averaged among the vertical column of the blocks. On the other hand, the motion vectors during the optical zooming operation are detected at the central horizontal row of the blocks including the center of the shot image, and the y-axis components of the detected motion vectors are averaged among the horizontal column of the blocks. The hand-movement vector is thus obtained with the averaged x-axis component and the averaged y-axis component. According to this method, since the central vertical column and horizontal row of the blocks are used for the calculation, the accuracy of the hand-movement vector will be higher when it is compared to a method for obtaining, from only the center block of the shot image, the hand-movement vector that is unaffected by the optical zoom.

Hereinafter explained is a shooting apparatus employed for performing the hand-movement correction methods explained with reference to FIG. 7 through FIG. 20.

Figure 21:
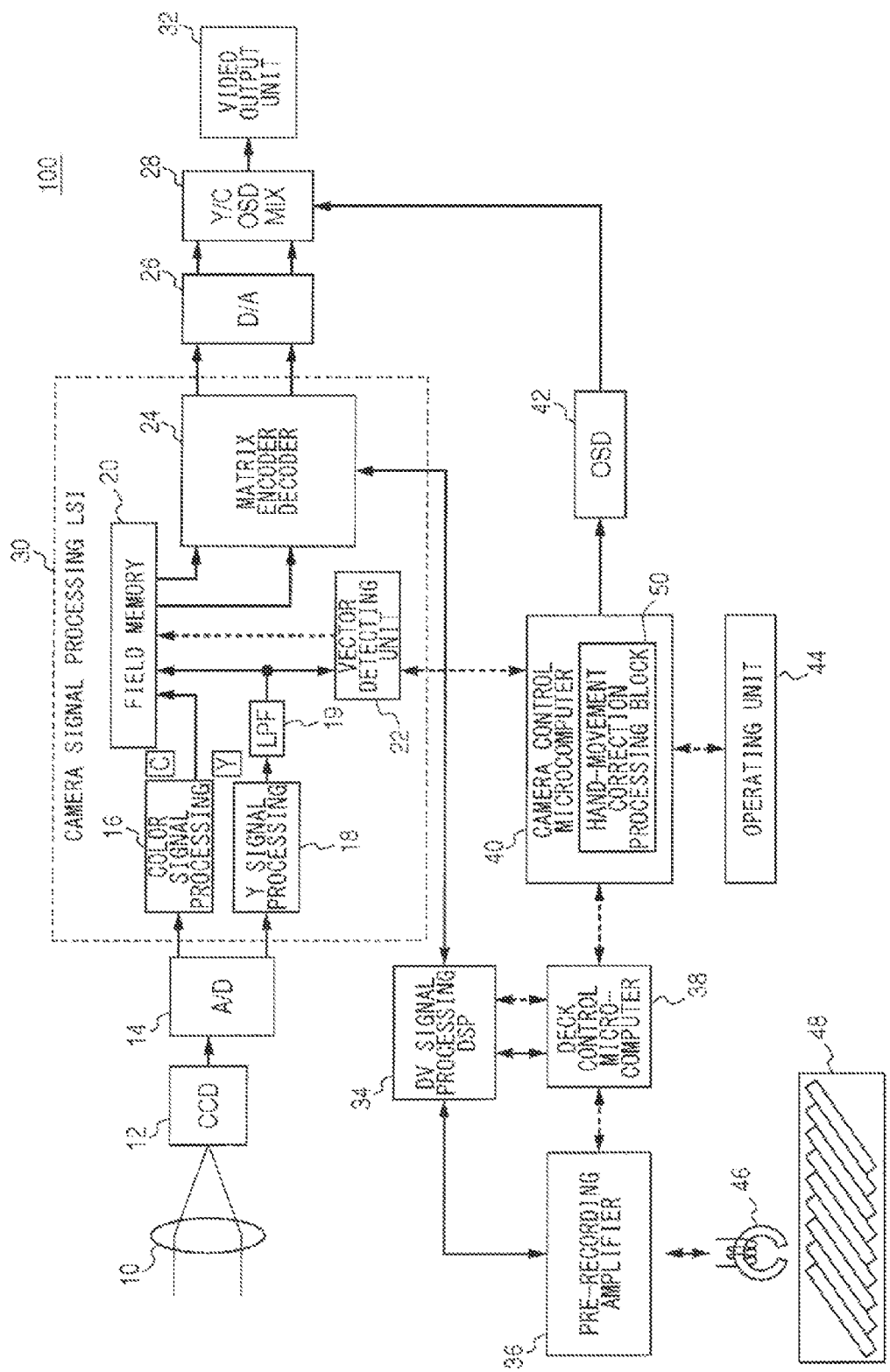
FIG. 21 is a block diagram of a shooting apparatus that is equipped with the hand-movement correction function according to the embodiments of the present invention.

FIG. 21 is a block diagram of a shooting apparatus 100 that is equipped with the hand-movement correction function according to the embodiments of the present invention. The shooting apparatus 100 explained herein is, as one example, a video camera for shooting a moving picture and recording it on a magnetic tape or in a hard disk or the like. Any other types of recording media can be also used, such as a digital versatile disc (DVD), a Blu-ray disc, semiconductor memory, a memory card, or the like. The shooting apparatus 100 may be, as another example, a digital still camera for shooting a still picture and recording it in a memory card or the like. Alternatively, the video camera may be provided with a mode for recording and replaying still pictures.

In FIG. 21, the solid arrow indicates the flow of the video information, and the dotted arrow indicated the flow of the control signal.

An image of an object through a lens 10 is focused on a charge-coupled device (CCD) 12. The shot image output from the CCD 12 is converted to a digital signal by an A/D converter 14 and input to a camera signal processing LSI 130.

In the camera signal processing LSI 130, a color signal processing unit 16 converts the digital signal, which is output from the A/D converter 14, to a color signal (C), and a Y signal processing unit 18 converts the digital signal, which is output from the A/D converter 14, to a luminance signal (Y). The color signal output from the color signal processing unit 16 is stored in a field memory 20. The luminance signal output from the Y signal processing unit 18 is subject to a low-pass filter (LPF) 19 and then stored in the field memory 20. The luminance signal is also input to a vector detecting unit 22 so that the signal can be used for the motion vector detection.

The vector detecting unit 22 detects a hand-movement vector based on the luminance signal of the shot image. The vector detecting unit 22 then shifts the central position for extracting the image from the field memory 20 according to the hand-movement vector and provides the field memory 20 with an instruction for extracting the image from the field memory 20.

The vector detecting unit 22 herein detects the hand-movement vector in cooperation with a hand-movement correction processing block 50 provided in a camera control microcomputer 40 so as to detect the hand-movement vector during the operation of the optical zoom. The vector detecting unit 22 provides the hand-movement correction processing block 50 with the motion vector detected from the shot image. The hand-movement correction processing block 50 eliminates a component caused by the optical zoom from the motion vector detected by the vector detecting unit 22 so as to calculate the hand-movement vector and provides the vector detecting unit 22 with the calculated hand-movement vector.

A matrix encoder and decoder 24 is provided with the color signal and the luminance signal of the shot image extracted from the specified central position of the field memory 20 in consideration of the shift caused by the hand movement. The matrix encoder and decoder 24 compression-encodes the shot image and provides a DV-signal processing DSP (digital signal processor) 34 with the encoded image information. In playing a recorded image, the matrix encoder and decoder 24 decodes the encoded image information provided from the DV signal processing DSP 34.

The color signal and the luminance signal of the shot image processed by the matrix encoder and decoder 24 are provided to a D/A converter 26, and the signals are converted to an analog signal. A Y/C and OSD signals mixer 28 mixes the luminance and color signals output form the D/A converter 26 and the OSD signal output from an on-screen display (OSD) circuit 42 and provides the mixed signal to a video output unit 32. The video output unit 32 displays the video signal on a screen.

An operating unit 44 receives from a user an instruction for operating the shooting apparatus 100 and provides the instruction to the camera control microcomputer 40. The camera control microcomputer 40, which is a controller that controls the overall shooting apparatus 100, controls the lens mechanism based on the instruction and changes the settings of a display device and so on. The camera control microcomputer 40 also instructs the OSD circuit 42 to generate the OSD signal for displaying a setting screen for the display device.

For instance, if an instruction for operating the optical zoom is given through the operating unit 44, the camera control microcomputer 40 adjusts the zoom of the lens 10. If an instruction for recoding a moving picture is given through the operating unit 44, the camera control microcomputer 40 provides the camera signal processing LSI 30 and a deck control microcomputer 38 with an instruction for recoding the moving picture. The deck control microcomputer 38 is a controller for controlling a deck unit that records the image on a magnetic tape 48 and reproduces the image from the magnetic tape 48.

The DV-signal processing DSP 34 processes the video data in a DV format that conforms to the DV standard; however, the video format used herein is not necessarily restricted to such a DV format. The DV-signal processing DSP 34 performs a signal processing on the encoded image data provided by the matrix encoder and decoder 24 and then converts it to the DV format with the addition of some control data such as tracking information, date information, or the like to provide it to a pre-recording amplifier 36. The pre-recording amplifier 36 modulates the input signal to provide it to a head 46. The signal provided to the head 46 is sequentially recorded along tracks on the magnetic tape 48.

When an instruction for reproducing the image recorded on the magnetic tape 48 is given through the operating unit 44, the head 46 retrieves the image data from the magnetic tape 48. The retrieved data is amplified by the pre-recording amplifier 36 and input to the DV-signal processing DSP 34. The DV-signal processing DSP 34 performs a signal processing on the input image data and then provides the processed data to the matrix encoder and decoder 24 and also provides various types of control data attached to the image data to the deck control microcomputer 38.

Figure 22:
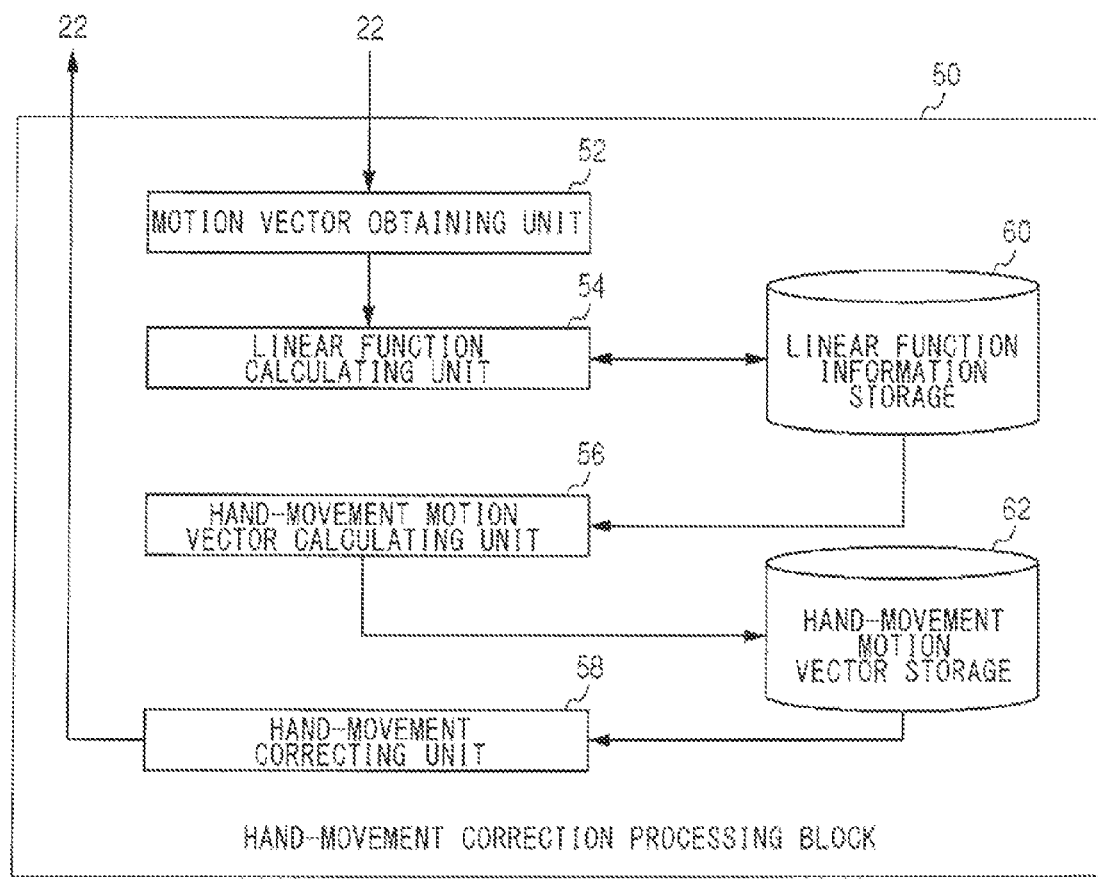
FIG. 22 is a block diagram of the hand-movement correction block of FIG. 21.

FIG. 22 is a block diagram of the hand-movement correction block 50 of FIG. 21. A motion vector obtaining unit 52 receives from the vector detector 22 motion vector information of each block in the shot image. As described in FIG. 5 and FIG. 6, the motion vector detected by the vector detector 22 contains the zoom vector component if any optical zooming operation was performed.

A linear function calculating unit 54 calculates for each block of the shot image a linear function that represents a straight line, the slope of which is the same as that of a line ("zoom baseline") passing through the center of the shot image and the representative point and which passes through the vector detection point. The calculated line is referred to as "hand-movement baseline." The information of the slope a and the intercept b of the linear function that represents the hand-movement baseline of each block is stored in linear function information storage 60. The detailed example of the process by the linear function calculating unit 54 has been described above with reference to FIG. 8 and FIG. 9.

Referring to the linear function information storage 60, the hand-movement motion vector calculating unit 56 selects two blocks that have the hand-movement baselines, the slope of which are different from each other. The hand-movement motion vector calculating unit 56 then obtains the intersection of the two hand-movement baselines of the selected blocks so as to calculate a hand-movement vector. The detailed example of the process by the hand-movement motion vector calculating unit 56 has been described above with reference to FIG. 10 and FIG. 14.

The linear function calculating unit 54 may aggregate a plurality of blocks that have the zoom baselines, the slopes of which are identical, into one group and average the values of the intercepts b of the linear functions, each of which represents the hand-movement baseline of each of the blocks that belong to the same group. Each group is thus represented by the intercept-averaged hand-movement baseline. The hand-movement motion vector calculating unit 56 may select at least two groups having the intercept-averaged hand-movement baselines, the slopes of which are different from each other, and obtain the intersection of the hand-movement baselines of the selected groups so as to calculate the hand-movement vector. This processing method has been described above with reference to FIG. 15 and FIG. 16.

The hand-movement motion vector calculating unit 56 stores in the hand-movement motion vector storage 62 the hand-movement vector thus obtained by selecting the two blocks having the zoom baselines of different slopes or selecting the above-mentioned two groups. The hand-movement motion vector calculating unit 56 then averages a plurality of the hand-movement vectors to obtain a final hand-movement vector and stores it in the hand-movement motion vector storage 62.

The hand-movement correcting unit 58 reads the final hand-movement vector from the hand-movement vector storage 62 and provides it to the vector detecting unit 22. The vector detecting unit 22 shifts the central position, which will be used for extracting the shot image from the field memory 20, based on the hand-movement vectors given by the hand-movement correcting unit 58.

The function for detecting the motion vector, which is provided in the vector detecting unit 22, may be provided in the motion vector obtaining unit 52 of the hand-movement correction processing block 50. The function for extracting the shot image from the memory based on the hand-movement vector, which is provided in the vector detecting unit 22, may be provided in the hand-movement correcting unit 58 of the hand-movement correction processing block 50.

The hand-movement correction processing block 50 may operate regardless of whether or not the optical zooming operation is being performed. The method has been described with reference to FIG. 17. By this method, the hand-movement correction processing block 50 can obtain the hand-movement vector during the normal shooting where the optical zooming operation is not performed and then will provide it to the vector detecting unit 22. The function of the vector detecting unit 22, in effect, is provided in the hand-movement correction processing block 50. Therefore it is not required to switch the hand-movement detection processes between the time of the zooming operation and the time of the normal shooting, which results in a simplified circuit configuration and the cost reduction of the product.

Another hand-movement vector calculation method has been described with reference to FIG. 18 and FIG. 19. According to the method, the hand-movement motion vector calculation unit 56 averages the two motion vectors detected for the two blocks, which are at the symmetrical position with respect to the center of the shot image, so as to cancel the motion component caused by the optical zooming and obtain the hand-movement vector.

The hand-movement motion vector calculation unit 56 may select a plurality of pairs of blocks at the symmetrical position with respect to the center of the shot image and average the two motion vectors of each pair so as to calculate the hand-movement vector for each pair. The hand-movement motion vector calculation unit 56 may average the hand-movement vectors calculated for the plurality of pairs of blocks so as to obtain the final hand-movement vector. If any one block of the two blocks at the symmetrical position has a lower degree of reliability than a predetermined threshold, the hand-movement motion vector calculation unit 56 may exclude the pair of those blocks from the calculation.

Yet another hand-movement vector calculation method has been described with reference to FIG. 20. According to the method, the motion vector obtaining unit 52 obtains the motion vector detected at the central column of blocks and at the central row of blocks of the shot image, if the shot image is divided into blocks in such a manner that the number of the blocks in a column and in a row is odd. The hand-movement motion vector calculating unit 56 averages the x-axis components of the motion vectors detected in the central column of blocks and also averages the y-axis components of the motion vectors detected in the central row of blocks so as to obtain the hand-movement vector with the averaged x-axis and y-axis components.

The present invention has been described based on the embodiments. These embodiments are merely exemplary, and it is understood by those skilled in the art that various modifications to the combination of each component and process thereof are possible and that such modifications are also within the scope of the present invention.

What is claimed is:

1. An image correction processing apparatus, the apparatus comprising a computer controller including:
    a motion vector obtaining unit that receives a detected motion vector of each block in a shot image during an optical zooming operation, wherein the shot image is divided into a plurality of blocks;
    a linear function calculating unit that for each block calculates a linear function that represents a straight line, wherein the slope of straight line is the same as that of a line passing through the center of the shot image and a representative point, and passes through a vector detection point;
    a hand-movement calculating unit that selects at least two blocks that have the calculated linear functions, wherein the slope of the calculated linear functions are different from each other, and configured to obtain an intersection of graphs of the linear functions of the selected blocks so as to calculate a motion vector caused by hand movement; and
    a hand-movement correcting unit that corrects the hand movement in the shot image based on the calculated motion vector caused by the hand movement.

2. The image correction processing apparatus of claim 1, wherein the linear function calculating unit further: aggregates a plurality of blocks that have the linear functions into one group, wherein the slopes of the linear functions are identical, and averages values of intercepts of the linear functions calculated in the blocks that belong to the same group; and the hand-movement calculating unit further: selects at least two groups with the intercept-averaged linear functions, wherein the slopes of the intercept-averaged linear functions are different from each other, and obtains an intersection of graphs of the linear functions of the selected groups so as to calculate the motion vector caused by the hand movement.

3. The image correction processing apparatus of claim 1, wherein processes by the motion vector obtaining unit, the linear function calculating unit, the hand-movement calculating unit and the hand-movement correcting unit are performed during the optical zooming operation and during a normal shooting with no optical zooming operation so that the hand-movement correction is performed during the normal shooting.

4. An image correction processing method, the method comprising:
- detecting a motion vector of each block in a shot image during an optical zooming operation, the image being divided into a plurality of blocks;
- calculating a linear function that represents a straight line for each block, wherein the slope of the line is the same as that of a line passing through the center of the shot image and a representative point, and which passes through a vector detection point;
- selecting at least two blocks that have the calculated linear functions, wherein the slope of the calculated linear functions are different from each other;
- obtaining an intersection of graphs of the linear functions of the selected blocks so as to calculate a motion vector caused by hand movement; and
- correcting the hand movement in the shot image based on the calculated motion vector caused by the hand movement.

5. A non-transitory computer readable storage medium having embodied thereon a computer program, the computer program executable to perform an image correction processing method, the method comprising:
- detecting a motion vector of each block in a shot image during an optical zooming operation, the image being divided into a plurality of blocks;
- calculating a linear function that represents a straight line for each block, wherein the slope of the line is the same as that of a line passing through the center of the shot image and a representative point, and which passes through a vector detection point;
- selecting at least two blocks that have the calculated linear functions, wherein the slope of the calculated linear functions are different from each other;
- obtaining an intersection of graphs of the linear functions of the selected blocks so as to calculate a motion vector caused by hand movement; and
- correcting the hand movement in the shot image based on the calculated motion vector caused by the hand movement.

* * * * *